Feb. 16, 1954   H. T. HOLZWARTH   2,669,420
TURBINE STRUCTURE
Filed July 3, 1948
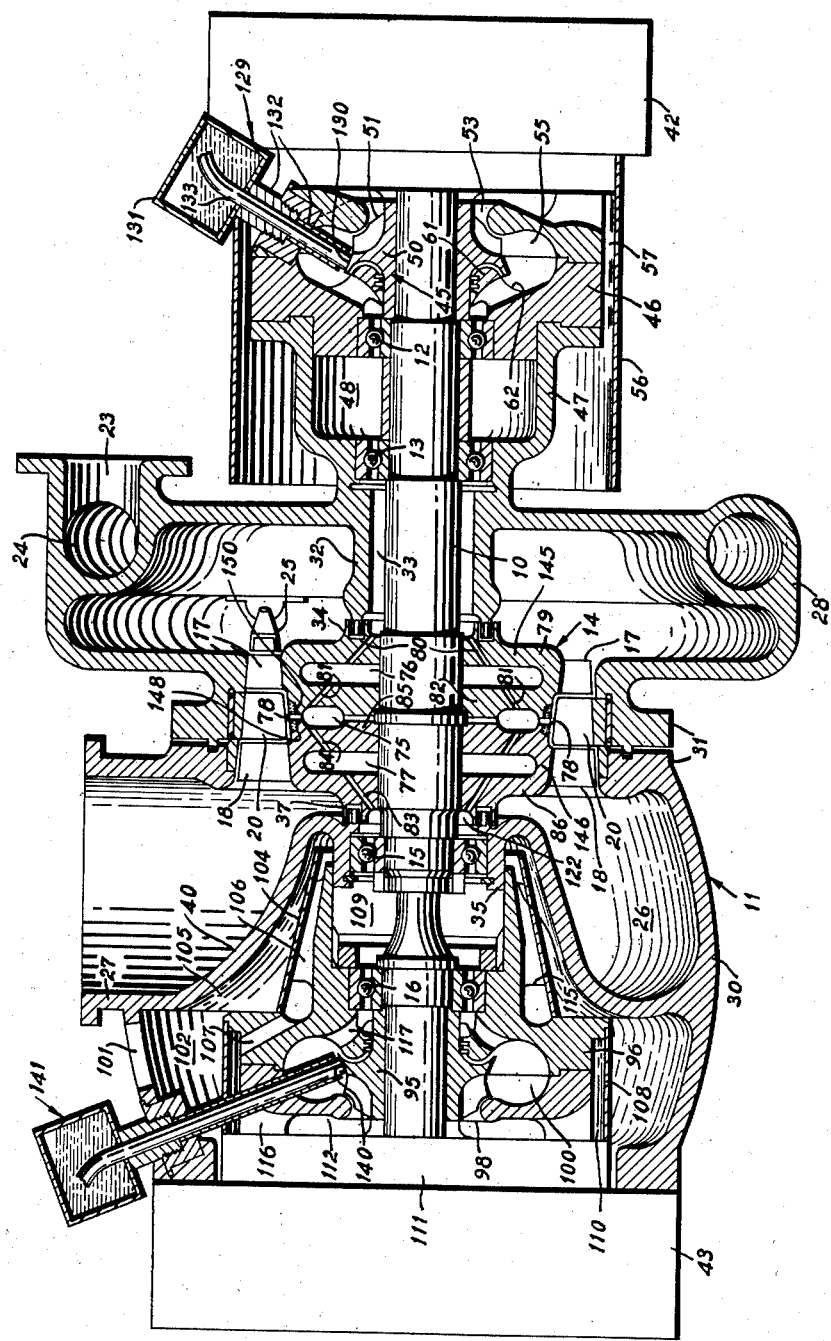
INVENTOR.
HANS T. HOLZWARTH
BY Patented Feb. 16, 1954

2,669,420

UNITED STATES PATENT OFFICE 2,669,420

TURBINE STRUCTURE

Hans T. Holzwarth, Westfield, N. J., assignor to The M. W. Kellogg Company, Jersey City, N. J., a corporation of Delaware Application July 3, 1948, Serial No. 36,946

3 Claims. (Cl. 253—39.1)

The present invention relates to a rotary power unit, and more particularly to the structure of its rotor, and to the means for sealing, cooling and lubricating various parts of said unit.

The provision of effective seals for the shaft openings and bearing housings in a rotary power unit, such as a high speed turbine, to prevent escape of motive fluid and lubricant, becomes a difficult design problem, especially in cases where the motive fluid driving the rotor has a high initial temperature, as in the case of a gas turbine, and where the unit is intended to be operated in any position in space, as in the case of an aircraft or other airborne device. In such a power unit, extreme care must be taken to avoid leakage, causing contact of the lubricant with any of the outside heated walls of the unit, or with the motive fluid outside the casing of the unit, since any such contact might cause destructive fires. To avoid or minimize such conditions, the seals would have to be labyrinthic in construction, and quite long, to afford numerous stages, and to provide numerous rings in the case of ring type seals, and would have to be unduly complicated by the necessity of providing in connection therewith such common expedients as vents, slingers and collecting spaces for the lubricant.

The necessity of reducing to a minimum surface velocities and clearance areas at sealing regions makes small diameter seals desirable. Therefore, shaft diameters should be as small as possible, consistent with proper rigidity of the shaft. Thus, it may be difficult or impossible to design a rotor with a critical speed above its desired high operating speed, especially if an extra long shaft span must be provided to afford effective sealing.

Among the principal objects of the invention are to provide a rotary power unit capable of high temperature service having (1) an arrangement which counteracts the tendency of leakage of motive fluid and lubricant, without the necessity of elaborate leakage seals and the like, (2) a positive lubricating arrangement which is unaffected by the position of the unit in space, and (3) an arrangement which permits cooling of the various bearings as well as the interior of the rotary element.

A further important object of the invention is to provide a new and improved turbine wheel of simple and inexpensive construction which may easily be formed by an investment casting operation, said wheel including a pair of spaced discs integral at their outer periphery supporting each blade row of said wheel and defining a structure which gradually decreases in thickness from the hub thereof to the blade row supported thereby, the space between said discs providing a hollow through which a medium may be circulated for cooling said wheel.

Various other objects of the invention will be apparent from the following particular description, and from an inspection of the accompanying drawing, showing mainly an axial section, and partly in side elevation, a gas turbine unit embodying the features of the present invention.

Referring to the drawing, the rotary power unit of the present invention is shown in the form of a small high speed gas turbine comprising a shaft 10 which is supported in a casing 11 by anti-friction bearings 12 and 13 on one side of a turbine wheel 14, and anti-friction bearings 15 and 16 on the other side, and which is shown of sectional construction. The turbine wheel 14 is keyed or otherwise affixed to the shaft 10, and is shown with two spaced series of blades 17 and 18 mounted at its outer periphery. Blade rows 17 and 18 are separated by a series of fixed blades 20 rigid with the casing 11. The blades 17 and 18 are desirably of the impulse type while the blades 20 serve as intermediate guide blades in a manner well known in the art. Although it is desirable for the turbine to be of the impulse type, as far as certain aspects of the invention are concerned, the blades 17 and 18 may be of the reaction type, and constitute two multi-pressure stages, as is well known in the art.

The casing 11 has an inlet 23 for the motive fluid, which may be steam, exhaust gases, or other highly heated gases coming from an associated engine or from a combustion chamber. The inlet 23 leads into an annular chamber 24 into which is connected a number of nozzles 25 (only one being shown) for directing the motive fluid toward the blades 17.

The exhaust side of the second stage of blades 18 communicates with an exhaust chamber 26 merging into exhaust passageway 27.

The casing 11 includes main sections 28 and 30 united by a flange and stud interconnection 31. The casing section 28 includes the inlet 23 and the inlet chamber 24, and the casing section 30 includes the exhaust chamber 26 and the passageway 27. The inlet section 28 includes an integral sleeve 32 encircling the shaft 10, and forming therewith an annular air passage 33. The sleeve 32 has at one end a labyrinth rotative connection 34 with the adjoining end of the turbine wheel 14. The exhaust section 30 includes an integral sleeve 35 which encircles the shaft 10, and forms a retainer for the anti-friction bearings 15. The sleeve 35 has at one end a labyrinth rotative connection 37 with the adjoining end of the turbine wheel 14. The outer side wall 40 of the exhaust chamber 26 is reversed to define the bearing sleeve housing 35. This arrangement serves to set the anti-friction bearings 15 close to the turbine wheel 14 to allow for the use of a shaft of minimum length.

Secured to the shaft 10 are shown two output devices 42 and 43 driven from the turbine wheel 14. These turbine driven devices 42 and 43 may, for example, constitute pumps, compressors, generators or the like.

For sealing, cooling and lubricating different parts of the right-hand section of the turbine unit, there is provided a centrifugal air impeller 45 keyed or otherwise affixed to the shaft 10. The impeller 45 is enclosed in a casing 46 secured to the sleeve bracket 47, which extends from the turbine inlet casing section 28, and which encircles the shaft 10 to form an annular air passage 48. The impeller 45 comprises a disc 50 having a series of impeller blades 51, and defining with the casing 46 an inlet passage or eye 53 and a discharge passage 55. A cylindrical shell 56 encircles the bracket 47 and the casing 46, and defines therewith a passage 57 leading to the compressor inlet 53. The shell 56 is connected at its outer end to the frame or housing structure of the driven device 42, and is open at its inner inlet end to the atmosphere.

Rigid with the compressor casing 46 are a series of guide blades 62 which together with shroud ring 61, carried by guide blades 62, direct the air from the discharge passage 55 to the openings between the balls and between the races of the anti-friction bearing 12. These openings communicate with one end of the air passage 48. The other end of air passage 48 communicates with the openings between the balls and races of the anti-friction bearing 13 which is supported in the turbine casing bracket extension 47. The openings of bearing 13 communicate with one end of the annular air passage 33, the other end of which extends past the radially inner side of the labyrinth connection 34.

The turbine wheel 14 is constructed to permit the circulation of cooling air into the interior thereof, and to form passages by which air streams are discharged therefrom into the exhaust chamber 26. For that purpose, the turbine wheel 14 has a central annular hollow 75 and two annular hollows 76 and 77 flanking said central hollow. A series of orifices 78 extend radially outwardly from the hollow 75 into the passages defined between the fixed guide blades 20. Air flow is established from the air passage 33 through the hollow 76 and 75 and into the passages between the fixed blades 20. For that purpose, the right-hand end wall 79 of the turbine wheel 14 has openings 80 extending between the inner end of the annular air passage 33 and the hollow 76, and inclined as a conical series with respect to the axis of the shaft 10, so that the direction of flow through said openings will have a radially outward component. Communication between the two hollows 75 and 76 is established by a conical series of openings 81 in the partition wall 82, extending substantially in alignment with the series of openings 80.

Flow communication between the left-hand end of the turbine wheel 14 and the hollow 77 is established by openings 83 which are located in the left-hand end wall 86 of said turbine wheel, and which are arranged in a conical series, so that the direction of air flow therethrough has a radially outward component. Communication between the two hollows 77 and 75 is established by means of a series of openings 84 in the partition wall 85 slanting in the same conical direction as the openings 83.

The air system for the left-hand side of the turbine wheel 14 is essentially the same as the air system just described for the right-hand side of the turbine wheel 14. The air system for the left-hand side includes a bladed impeller 95, based in a casing 96, which receives air from the inlet 98 and discharges it into the chamber 100. The air passes from discharge chamber 100 through varied passageway 117 into the spaces between the races and balls of the bearing 16 and from thence into the annular passage 109. From the latter passage the air enters the spaces between the balls and races of the bearing 15 and flows into the annular chamber 122 from whence a part may flow through the labyrinth 37 into the exhaust passageway 27 while the remainder flows through the holes 83, the annular chamber 77 and the holes 84 into hollow 75 to join the air from the system for the right-hand side of the turbine 14 on its way through orifices 78.

For delivering intake air to the compressor inlet 98, the turbine discharge casing section 30 has an opening 101 through which air enters into a chamber 102. A conical baffle 104 extends from the compressor casing 96 to form annular passages 105 and 106. The compressor casing 96 has a series of passages 107 which open into an annular passage 110 closed by a cylindrical shell 108. A wall member 111 of the output device 43, defines with the compressor casing 96 a passage 112 which communicates with the annular passage 110 and the compressor inlet 98. In the passages 106 and 112 are a series of guide blades 115 and 116 which serve to smooth out any turbulence in the intake air stream as it is drawn through the different passages towards the compressor inlet 98.

The air pressure at the labyrinth connections 34 and 37 is such as to assure a small flow of air therethrough into the turbine casing 11. In this manner, any tendency for the motive fluid from the casing 11 to leak through the labyrinth connections 34 and 37 through the different bearings 12, 13, 15 and 16 to the outside of said casing, is counteracted or nullified. Also, since such leakage of the intake or exhaust motive fluid to the outside of the turbine casing is attended with leakage of the lubricant from the bearings 12, 13, 15 and 16, it is seen that the air stream operating as described, also serves to prevent escape of this lubricant to the outside of said casing.

The air as it flows through the different passages from the two impellers 45 and 95, serves not only to prevent leakage as described but also serves to cool the various labyrinths, connections and bearings, as well as the turbine wheel 14.

In an impulse type turbine, the pressure differential required to assure a positive flow in one direction, is small, since exhaust pressure prevails throughout the turbine casing. Therefore, the power requirements of the air stream are very small, and may be as small as 1% of the turbine output in the case of a unit such as that shown.

As an additional feature of the present invention, the air system by which the sealing and cooling of the different parts of the turbine unit is effected, also operates to lubricate certain of these parts. For that purpose, the impeller disc 50 is provided on its outer periphery with a conical surface 130 in the path of air flow from the compressor. A film of lubricating oil is applied to this surface 130 by means of a fountain or oil supply device 129, comprising a supply vessel 131 having a tube 132 extending close to said surface. A wick 133 retained in this tube 132 projects at one end into the supply vessel 131, and at its other end touches the impeller disc surface 130 lightly. As the surface 130 rotates, it throws off the oil by centrifugal action, so that this oil is carried off by the air stream in the form of a suspended mist through the bearings 12 and 13, past the labyrinth connection 34, through the different passages and hollows in the turbine wheel 14, and into the region of the fixed blades 20. The lubricant then passes into the exhaust chamber 26, where it finally burns off and where the liberated heat does not cause any damage.

The impeller 95 is similarly provided at its outer periphery with a conical surface 140, to which oil is applied by means of an oil supply device 141 which is similar to that shown in connection with the impeller 45, so that the air stream as it passes from the impeller 95 picks up the particles of oil cast off by centrifugal force and carries them for lubrication of the bearings 16, 15 and the labyrinth connection 37.

As an additional feature of the present invention, the turbine wheel 14 is so constructed that it may be easily and cheaply manufactured by investment casting. For that purpose, the turbine wheel 14 is made from two substantially similar cast disc sections 145 and 146. These turbine wheel sections 145 and 146 may be easily cast with the hollows 76 and 77, since these hollows extend to the inner periphery thereof. At the confronting faces of the two sections 145 and 146, these sections may be formed with annular recesses which, when the sections are put together, define the hollow 75. Before the turbine sections 145 and 146 are assembled recesses 148 are formed at the outer periphery of their confronting portions. When sections 145 and 146 are mounted together, these recesses 148 conjointly form an annular peripheral welding trough, along which said sections are welded together with weld metal 150. The weld metal 150, which forms a solid homogeneous ring bond between the two turbine sections 145 and 146, is then machined to form the orifices 78. Whereas it is preferred to make the two substantially similar disc sections 145 and 146 of turbine wheel 14 by means of investment casting it will be understood that these discs can be manufactured by other casting methods or can be machined from a rough casting or forging.

As many changes can be made in the above apparatus, and many apparently widely different embodiments of this invention can be made without departing from the scope of the claims, it is intended that all matter contained in the above description or shown in the accompanying drawing shall be interpreted as illustrative and not limitative.

What is claimed is:

1. A power unit comprising a casing, a hollow turbine wheel in said casing having end faces and also passages establishing flow communication through the hollow of said wheel from one region on the outside of said wheel to another region on the outside of said wheel, sealing means between each of the opposite end faces of said wheel and said casing, a shaft for said turbine wheel, bearings between said shaft and said casing, air passage means extending through said bearings past said sealing means and to one of said outside wheel regions, and means mounted on said shaft for producing air currents for flow through said air passage means to cool said bearings and said turbine wheel and to prevent leakage of turbine motive fluid out of said casing through said sealing means.

2. A turbine wheel comprising a pair of opposed hollow disc sections having respective annular recesses at their confronting faces conjointly defining an annular hollow spaced radially inwardly from the inner periphery of said wheel, said disc sections being welded together across their junction faces, each of said disc sections having flow passages between its outer end wall and its recess, said wheel having other flow passages extending substantially radially from said hollow to the outside of said wheel.

3. A turbine wheel as described in claim 2, in which said disc sections are recessed at the outer periphery of their confronting faces to form between said sections an annular weld trough, said sections being rigidly secured together by weld metal in said trough and said passages from said hollow to the outer periphery of said wheel extending radially outwardly through said weld metal.

HANS T. HOLZWARTH.

References Cited in the file of this patent

UNITED STATES PATENTS

| Number | Name | Date |
|---|---|---|
| 1,769,736 | Fieux | July 1, 1930 |
| 1,859,068 | Beach | May 17, 1932 |
| 1,880,747 | Bowen | Oct. 4, 1932 |
| 1,960,810 | Gordon | May 29, 1934 |
| 2,073,605 | Belluzzo | Mar. 16, 1937 |
| 2,174,854 | Corwin | Oct. 3, 1939 |
| 2,243,467 | Jendrassik | May 27, 1941 |
| 2,296,701 | Butler et al. | Sept. 22, 1942 |
| 2,382,564 | Haverstick | Aug. 14, 1945 |
| 2,401,826 | Halford | June 11, 1946 |
| 2,414,788 | Altorfer et al. | Jan. 28, 1947 |
| 2,427,614 | Meier | Sept. 16, 1947 |
| 2,440,069 | Bloomberg | Apr. 20, 1948 |
| 2,440,890 | Birmann | May 4, 1948 |
| 2,440,933 | Cunningham | May 4, 1948 |
| 2,445,837 | McKenzie | July 27, 1948 |
| 2,462,600 | Boestad et al. | Feb. 22, 1949 |
| 2,483,616 | Bergstedt | Oct. 4, 1949 |
| 2,492,672 | Wood | Dec. 27, 1949 |

FOREIGN PATENTS

| Number | Country | Date |
|---|---|---|
| 512,301 | Great Britain | Aug. 31, 1939 |
| 557,860 | Germany | Aug. 29, 1932 |
| 919,016 | France | Nov. 18, 1946 |